United States Patent Office 3,065,159
Patented Nov. 20, 1962

3,065,159
USE OF NUCLEAR FISSION IN SYNTHESIZING ORGANIC COMPOUNDS
Willard P. Conner, Jr., Chadds Ford, Pa., and William E. Davis, Wilmington, Del., assignors to Hercules Powder Company, Wilmington, Del., a corporation of Delaware
No Drawing. Filed Dec. 17, 1957, Ser. No. 703,239
14 Claims. (Cl. 204—154.2)

This invention relates to a process for the synthesis of organic chemical compounds wherein the effects of the fissioning of atomic nuclei are used to produce organic molecular fragments which then combine to produce the desired compounds. More particularly, the invention relates to the use of fission fragments, in addition to alpha, beta, gamma, and neutron energy, also released upon nuclear fission, in the synthesis of more complex organic chemical compounds from simple organic chemical compounds, and particularly where such compounds are not normally considered to be mutally chemically reactive.

It has long been known that certain chemical reactions can be initiated by electrons in motion as, for example, in gas discharges, ozonizers, etc., and by alpha-, beta-, and gamma-radiation from radioactive materials. Except in a very few applications such as ozone production, these methods show no advantage over the usual procedure for chemical synthesis because they require too much equipment and too large an operating effort and cost for each pound of product.

Now, in accordance with this invention, it has been found that the effects from fissioning atomic nuclei may be used for initiating chemical reactions, and particularly between organic compounds which are considered to be mutually nonreactive, by causing fissionable atomic nuclei which have been dispersed throughout the reactants to fission. For example, a chemically stable organic compound may be made to react with itself by causing fissionable atomic nuclei which have been dispersed in the compound to fission. Nuclear fission, such as occurs in a controlled fashion in an atomic pile, releases tremendous quantities of energy which may thus be used for the initiation of chemical reactions. This energy is in part composed of the well-known alpha-, beta-, gamma-, and neutron-radiation. However, the major part of the total energy released, about 80%, is in the form of high velocity charged particles identified as fission fragments. These particles are distinguishable from those rays accompanying natural or induced radioactivity in that fission fragments have higher energy, higher mass, and higher electric charge. Nuclear fission is thus not only a source of abundant quantities of alpha, beta, and gamma particles and neutrons, but is also a source of the fission fragments, which in accordance with this invention may be used as an entirely new type of chemically activating particle. Previous to the present invention, only the beta-, gamma-, and neutron-radiation released from atomic fission, and only a fraction of that, was believed to be useful for chemical processing. However, by using the present invention, the output of chemical product per unit of consumed fissionable fuel can be increased by more than a factor of ten.

The process in accordance with this invention is, in general, carried out by dispersing in or otherwise intimately contacting fissionable atomic nuclei with the organic compound or mixture of organic compounds to be reacted and then causing the dispersed fissionable atomic nuclei to fission, whereby a fragmentation of the organic compound or mixture of compounds occurs and the organic molecular fragments so produced then combine to produce one or more organic compounds different from the starting materials. Thus for example, fissionable atomic nuclei may be dispersed in an alcohol such as methanol and on fission of the atomic nuclei, one of the carbon to hydrogen bonds in the methanol molecule is ruptured to produce a methylol fragment and these methylol fragments then combine to form ethylene glycol. In the same way, molecules of many other compounds may be made to react with one another by the rupture of a carbon to hydrogen bond followed by dimerization of the fragment so formed. The process may also be applied to mixtures of organic compounds or mixtures of organic and inorganic compounds, in which case there will be not only dimerization of the fragments produced from each of the compounds in the mixture, but also combination of the dissimilar fragments.

The following examples will illustrate the process of this invention. All parts are by weight unless otherwise indicated.

Example 1

Sixteen parts of methanol containing 40 mg. of natural uranium per ml. as a dispersion of $UO_2$ having a particle size of less than three microns in diameter was placed in a quartz tube. The tube was evacuated and sealed and wedged into an aluminum tube. The aluminum tube was sealed by welding. The aluminum tube was supported on each end by a graphite bearing and was placed in a horizontal hole in a heavy-water, enriched uranium nuclear reactor. The tube was rotated on the graphite bearings by means of a motor through a flexible shaft. The rotation was continued for 22 hours during which the tube was exposed to an average thermal neutron flux of about $10^{12}$ neutrons per sq. cm. per second at the ambient temperature in the reactor (about 60° C.). At the end of the irradiation the tube was withdrawn into the reactor shield where radioactivity was allowed to decay for approximately one hour. The tube was then removed to a lead coffin and stored for one week. At the end of this storage time the radioactivity at the surface of the aluminum tube had decayed to approximately 100 mr./hr. The aluminum tube was then opened and the quartz tube was broken inside a sealed evacuated container so that the pressure and amount of gaseous products could be measured. Samples of the gas were withdrawn for analysis. The liquid containing the uranium oxide was centrifuged and the clear supernatant organic layer was decanted. The uranium oxide was washed by decantation with approximately 5 parts of methanol. Analysis of the liquid portion showed ethylene glycol (by periodic oxidation) equivalent to 27% of the methanol decomposed and formaldehyde (by chromotropic acid) equivalent to 22% of the methanol decomposed. The ethylene glycol was separated by distillation of the liquid portion to remove the formaldehyde and methanol. The gaseous products were primarly hydrogen, carbon monoxide (equivalent to 35% of the methanol decomposed), methane (equivalent to 11% of the methanol decomposed) and minor amounts of ethylene, acetylene, carbon dioxide, and the like. About 3.5% of the original methanol was decomposed to the above products by the nuclear reactor irradiation.

Example 2

Twenty parts of acetic acid containing 40 mg. of natural uranium per ml. in solution as uranyl acetate was sealed in a quartz tube and the quartz tube was exposed to thermal neutron irradiation as in Example 1. The irradiation time was 44 hours giving an integrated neutron flux of approximately $2 \times 10^{17}$ neutrons per sq. cm. After the inducted radioactivity had decayed to approximately 100 mr./hr., the sample tube was opened as in Example 1 and a gas sample was analyzed. The yellow color of the original solution had been completely discharged and a black precipitate, presumably uranium oxides, was found. An aliquot of the recovered liquid was evaporated to dryness and the residue was titrated to measure nonvolatile acids. The remainder of the liquid was completely esterified with methanol and distilled to separate the organic fraction from the remaining radioactive compounds. Dimethyl succinate was identified in the distillate by means of mass spectrometry and infrared spectrometry. The analysis indicated that 10% of the decomposed acetic acid had been converted to succinic acid. The dimethyl succinate fraction was fractionally distilled and recovery of about 90% of the dimethyl succinate indicated by analysis was achieved to yield a product of boiling point 193°±2° C. Approximately 60% of the decomposed acetic acid was converted to an equimolar mixture of carbon monoxide and carbon dioxide. Quantities of hydrogen, ethane, methane, ethylene, and acetylene were also found. The total acetic acid decomposed amounted to about 2.7% of the original acetic acid.

*Example 3*

Fifteen parts of a 50–50 by volume mixture of ethanol and hexane to which 25 mg. of natural uranium per ml. was added in the form of a slurry of $UO_2$ having a particle size less than three microns in diameter was sealed in a quartz tube and irradiated as described in Example 1. The tube was exposed to a neutron flux of about $10^{12}$ neutrons per sq. cm. per second for 44 hours. After the radioactivity had decayed, the organic compounds were separated from the slurry by centrifugation. The recovered liquid products separated into two layers. The upper layer contained no functional groups by infrared spectrophotometry. It contained hexane and dodecanes mixed with small amounts of other hydrocarbons. The lower layer was a mixture of ethanol, butanediols, octanols, and similar compounds. The gaseous products included hydrogen, carbon monoxide, butane, ethylene, methane, and smaller quantities of acetylene, ethane, propane, and allene.

*Example 4*

Fifteen parts of acetonirrile containing 40 mg. of natural uranium per ml. as a dispersion of $UO_2$ having a particle size of less than 10 microns in diameter was sealed in a quartz tube and, as described in Example 1, was exposed to a thermal neutron flux of about $10^{12}$ neutrons per sq. cm. per second for 22 hours. After the radioactivity had decayed to approximately 100 mr./hr., the organic phase was separated by centrifugation. The liquid was evaporated to dryness and was hydrolyzed with sodium hydroxide and then neutralized with hydrochloric acid. The mixture was again evaporated to dryness. The succinic acid so recovered was equivalent to a conversion of 15% of the original acetonitrile to succinonitrile. In addition to succinonitrile, some polymeric material was formed. The gaseous products included acetylene, methane, ethane, and ethylene, each equivalent to few percent of the decomposed acetonirtile. Hydrogen was a major component of the gas.

*Example 5*

Eighteen parts of methyl acetate containing 50 mg. of natural uranium per ml. as a dispersion of $UO_2$ having a particle size less than 3 microns in diameter was placed in an aluminum tube. The tube was cooled in Dry Ice, evacuated to remove air, and welded shut. The tube, supported at each end by graphite bearings, was inserted in a nuclear reactor as in Example 1 and exposed to a thermal neutron flux of about $10^{12}$ neutrons per sq. cm. per second for 22 hours. After radioactivity had decayed to less than 100 mr./hr. the tube was opened, both gaseous and liquid products were recovered, and the liquid was centrifuged to remove $UO_2$ as in Example 1. An aliquot of the liquid was hydrolyzed with sodium hydroxide and then oxidized with periodic acid. Ethylene glycol was found in quantity which indicated a conversion of 11% of the decomposed methyl acetate to glycol diacetate. Another aliquot of the liquid similarly hydrolyzed was acidified and evaporated to dryness to remove volatile organic acids. The residue was titrated. Succinic acid was found in quantity to indicate that 9% of the decomposed methyl acetate had been converted to dimethyl succinate. A third aliquot of the liquid was pyrolyzed in a sealed tube at approximately 225° C. A bromine number test indicated unsaturation due to methyl acrylate as a pyrolysis product of methyl β-acetoxypropionate. The latter compounds was present in an amount equal to 20% of the decomposed methyl acetate. The remainder of the liquid reaction mixture was then fractionally distilled under reduced pressure to recover the unreacted methanol and isolate the glycol diacetate, dimethyl succinate and methyl β-acetoxypropionate. Gaseous products included hydrogen, carbon monoxide, methane, ethane, carbon dioxide, acetylene, and ethylene. Methyl acetate decomposed was 3.4% of the total.

*Example 6*

The irradiation of Example 5 was repeated, substituting 20 parts of anisole for the 18 parts of methyl acetate. The recovered products were analyzed by their ultraviolet, infrared and mass spectra. About 2.2% of the anisole was decomposed with about half of this appearing as the dimers dimethoxy-biphenyl and glycol diphenyl ether. Benzene, phenol, and methanol were the chief components of the liquid fraction other than the dimers. The latter were isolated by fractional distillation of the liquid reaction mixture in vacuo. Hydrogen, carbon monoxide, acetylene, and methane were found in the gas.

*Example 7*

The irradiation of Example 5 was repeated substituting 20 parts of acetic anhydride for the 18 parts of methyl acetate. The gaseous products were analyzed by their mass spectra, while the liquid product was hydrolyzed with water and was evaporated to dryness. Succinic acid was recovered from the residue in quantity to indicate that succinic anhydride had been formed in quantities equivalent to 20% of the acetic anhydride decomposed. Yields of gases based on acetic anhydride decomposed were carbon monoxide 35%, carbon dioxide 20%, and ethane 15% with smaller amounts of methane, acetylene, and ethylene. Hydrogen was a major component of the gas.

*Example 8*

The irradiation of Example 5 was repeated, substituting a mixture of 6 parts of methanol and 12 parts of water for the 18 parts of methyl acetate. Analysis of the products were carried out according to Example 1. About 2% of the methanol was decomposed with about 25% of this quantity appearing as glycol and 35% appearing as formaldehyde. Hydrogen, carbon monoxide, methane, carbon dioxide, and ethylene were components of the gaseous products.

*Example 9*

A cylindrical aluminum reaction vessel was made by welding aluminum plate to the ends of a suitable piece of aluminum pipe. One of the end plates had a half-inch diameter by six inch length of aluminum tubing extending through it and welded to it. Twenty-five ml. of an ethanol solution of uranyl nitrate (0.07 gram total $UO_2(NO_3)_2 \cdot 6H_2O$ of which the uranium-235 content was 20% of the total uranium) was introduced into the reactor through the ½-inch aluminum tube. The reaction vessel was rotated around a horizontal axis and the ethanol was removed by evaporation with a stream of air. The vessel was then heated to 350° C. for several hours to deposit the uranium on the inner surface of the cylinder as a uniform tightly-adhering black film. Ten parts of methanol was added to the cylinder, the cylinder was cooled in a Dry Ice-acetone mixture, a vacuum was applied to remove air from the cylinder, and the ½-inch aluminum entrance tube was sealed by collapsing it and then welding it. The reactor was wrapped with Nichrome resistance wire for heating, thermocouples were installed, and the vessel was insulated with boron-free insulation. The assembly was fitted into a secondary container of aluminum tubing and the entire vessel was put into a hole in a nuclear reactor. Electrical heating by means of the Nichrome resistance wire was used to bring the temperature of the reactor to 150° C. at which temperature the methanol was entirely in the vapor phase. The reaction vessel was exposed at this temperature for 17 hours and received an integrated neutron flux of $7 \times 10^{16}$ neutrons per sq. cm. After removal from the nuclear reactor, the reaction vessel was stored for two months to let radioactivity decay. The inner vessel was then opened and the volatile products were removed to cold traps by reduced pressure evaporation. The vessel was then cut open and nonvolatile products were rinsed out with a total of about 25 parts of methanol. Analytical procedures similar to those of Example 1 were used to show that about 8% of the methanol was decomposed with about 60% of the decomposed methanol appearing as ethylene glycol. Carbon monoxide, methane, formaldehyde, and hydrogen were the other products. The ethylene glycol was isolated by fractional distillation of the liquid portion.

*Example 10*

Example 9 was repeated except that 0.15 part of carbon tetrachloride was added to the 10 parts of methanol before irradiation. Analysis showed approximately 10% of the methanol was decomposed with approximately 70% of this quantity appearing as ethylene glycol. Hydrogen, carbon monoxide, methane and formaldehyde were other products of the reaction.

*Example 11*

Example 9 was repeated except that after introducing the 10 parts of methanol, cooling the vessel, and evacuating to remove air, helium gas was added until the internal pressure was 20 lb./sq. inch absolute. The tube was then sealed and irradiated as in Example 9. The products showed about 8% decomposition of methanol with about 70% of this amount appearing as ethylene glycol. Hydrogen, carbon monoxide, methane, and formaldehyde were the other products of the reaction.

*Example 12*

Methanol containing 40 mg. of natural uranium per milliliter as a dispersion of $UO_2$ having a particle size of less than 3 microns in diameter was placed in a quartz tube and exposed to a thermal neutron flux of about $10^{12}$ neutrons per square centimeter per second for several hours. After the radioactivity had decayed to a safe level, the uranium slurry was separated from the organic phase. The product was found to contain both ethylene glycol and formaldehyde, the latter in a lesser amount.

*Example 13*

Acetic acid containing 20 mg. of natural uranium per milliliter in solution as uranyl acetate was placed in a quartz tube and exposed to a thermal neutron flux of about $10^{12}$ neutrons per square centimeter per second for several hours. After the radioactivity had decayed to safe levels, the sample was completely esterified with methanol and distilled to separate the organic fraction from the remaining radioactive compounds. Methyl succinate was identified in the distillate.

*Example 14*

A 50:50 by volume mixture of ethanol and hexane to which 25 mg. of natural uranium per milliliter was added in the form of a slurry of $UO_2$ having a particle size less than 3 microns in diameter was placed in a quartz tube and exposed to a neutron flux of about $10^{12}$ neutrons per square centimeter per second for several hours. After the radioactivity had decayed, the organic compounds were separated from the slurry. The product was found to contain a mixture of butanediols, octanols, and dodecanes.

*Example 15*

Acetonitrile containing 40 mg. of natural uranium per milliliter as a dispersion of $UO_2$ having a particle size of less than 10 microns in diameter was placed in a quartz tube and exposed to a thermal neutron flux of about $10^{12}$ neutrons per square centimeter per second for several hours. After the radioactivity had decayed to a safe level, the organic phase was separated from the inorganic slurry and succinonitrile was identified in the product.

The process of this invention makes it possible to synthesize organic compounds by initiating a reaction between molecules that are normally considered to be mutually unreactive. It may be used to initiate reaction between a wide variety of organic compounds, but, in general, is best used to prepare products from compounds which give simple fragmentation patterns under the influence of high energy charged particles. Reactions between all types of organic chemical compounds will occur, but they will be more specific if the molecular structure of the organic compound is relatively simple since the variety of activated species or fragments produced will be limited and consequently a higher yield of a particular product will be obtained. Of particular suitability to this method of synthesizing organic compounds is the synthesis of higher molecular weight compounds from lower molecular weight compounds, as, for example, the reaction of a simple compound with itself to produce a dimer of the molecular fragment formed when a carbon to hydrogen bond of the simple compound is ruptured on exposure to fission fragments. Exemplary of such reactions are the preparations of ethylene glycol from methyl alcohol, mixed butanediols from ethanol, succinic acid from acetic acid, dimethylsuccinic acid from propionic acid, and succinonitrile from acetonitrile. In each of these cases, one of the chief reactions that occurs is a rupture of a carbon to hydrogen bond with the subsequent dimerization of the organic molecular fragments so produced, which reaction may be thought of as a dehydrogenation reaction between two molecules of the organic compound. In some cases more than one carbon to hydrogen bond may be ruptured in a single molecule and the two fragments then join to form a cyclic structure as, e.g., in the synthesis of succinic anhydride from acetic anhydride. While the rupture between a carbon to hydrogen bond in the simple or monofunctional compounds is a major reaction that occurs, rupture between carbon to oxygen, carbon to carbon, etc., bonds may also occur and the organic molecular fragments so produced by such ruptures will then combine with themselves or with the fragments produced on the rupture of a carbon to hydrogen bond. In this case a greater variety of products will be produced. This type of reaction will, of course, be more prevalent in the case of compounds having a more complex molecular structure, that is, di- or poly-functional organic compounds.

This fragmentation of organic molecules by exposure to fission fragments from the fissioning of atomic nuclei with the subsequent dimerization or combination of the organic molecular fragments so produced will occur with alcohols, ethers, esters, ketones, carboxylic acids, carboxylic acid anhydrides, the sulfur analogs of any of these compounds, nitriles, amines, amides, hydrocarbons, halogenated hydrocarbons, organic phosphorus compounds, and a wide variety of other organic compounds. Of particular importance is the use of this process in the synthesis of organic compounds from alcohols, ethers, carboxylic acids or their anhydrides, esters, nitriles, and hydrocarbons. These compounds on exposure to fissioning atomic nuclei will produce fragments which are capable of dimerization. Thus, dihydric alcohols may be produced from monohydric alcohols by exposing the monohydric alcohol to fissioning atomic nuclei, as, for example, in the synthesis of ethylene glycol from methanol, butanediol from ethanol, etc. In the same way, polyhydric alcohols may be produced from dihydric alcohols, as, for example, in the synthesis of erythritol from ethylene glycol, and dihydroxy aromatic compounds from monohydroxy aromatic compounds, as, for example, in the synthesis of 1,2-bis(hydroxyphenyl)ethanes from cresols. Diethers may be produced from monoethers, diamines from monoamines, diamides from monoamides, diketones from monoketones, dinitriles from mononitriles, dicarboxylic acids from monocarboxylic acids and preferably from monocarboxylic acid anhydrides, and higher molecular weight hydrocarbons from lower molecular weight hydrocarbons, as, for example, in the production of isooctane from isobutane, etc.

The process of this invention may also be applied to the initiation of reactions between dissimilar organic compounds, that is, between two or more different organic compounds. In this case, fragmentation of the molecules of each of the oganic compounds in the mixture will be produced, and these fragments may then combine with like or dissimilar fragments to produce a mixture of products. For example, if a mixture of two different organic compounds is exposed to fission fragments, each of the organic compounds will form fragments which may be called A fragments and B fragments, and these fragments on dimerizing and combining will produce the organic compounds AA, BB and AB. In addition, there may be decomposition fragments produced, that is, fragmentation of other than a carbon to hydrogen bond, as, for example, rupture of a carbon to carbon bond, etc., which fragments may also combine with themselves or with fragments A and B. The relative yields of these four groups of products in such a reaction will obviously be influenced by the ratio of the initial concentration of the reactants. Illustrative of this class of reactants is the reaction of an alcohol with an aliphatic hydrocarbon, as, for example, in the reaction of methanol with hexane to produce heptanols; with heptane to produce octanols; with octane to produce nonanols, etc. Equally representative are the reactions initiated in mixtures of hydrocarbons with other alcohols, as well as with acids, esters, ethers, nitriles, and amines to produce various combined compounds. For example, a mixture of hydrocarbons such as paraffin may be reacted with methanol or other alcohol to produce a mixture of high molecular weight alcohols. In the same way, hydrocarbons may be reacted with an acid, as, for example, heptane with acetic acid to produce mixed caprylic acids or with a nitrile, as, for example, heptane with acetonitrile to produce caprylonitrile. The reaction may also be applied to mixtures of monofunctional organic compounds to produce multifunctional combined molecules, as, for example, by exposing to fission fragments mixtures of two or more alcohols, acids, esters, ethers, aldehydes, ketones, nitriles, amines, etc., or any combination of these. In these reactions also, hydrogen will be generated along with small amounts of low molecular weight by-products.

As will be readily appreciated, a wide variety of organic compounds may be exposed to fissioning atomic nuclei to produce organic compounds different from and usually of higher molecular weight and possibly more complex than the original starting compound or compounds and frequently also with less complex compounds produced as by-products. Exemplary of the alcohols to which the process of this invention may be applied and which will undergo fragmentation by the process of this invention with subsequent combination of the molecular fragments so produced are aliphatic, cycloaliphatic, and aromatic monohydric alcohols such as methanol, ethanol, propanol, and the higher homologs thereof, cyclohexanol, benzyl alcohol, etc., and polyhydric alcohols, as, for example, glycols such as ethylene glycol, glycerol, pentaerythritol, etc. Exemplary of other organic compounds that may be used as the starting material in the process of this invention are phenols such as phenol, cresol, resorcinol, etc., aliphatic, cycloaliphatic, and aromatic carboxylic acids, as, for example, acetic, propionic, and butyric acids, and higher homologs thereof such as oleic acid, stearic acid, etc., cyclohexylcarboxylic acid, benzoic acid, phenylacetic acid, etc., or the anhydrides of any of these acids, nitriles such as acetonitrile, propionitrile, and higher homologs thereof, phenylacetonitrile, etc., amines, as, for example, primary, secondary, and tertiary amines such as methylamine, ethylamine, propylamine, aniline, etc., dimethylamine, diethylamine, trimethylamine, triethylamine, etc., ethers such as diethyl ether, methyl ethyl ether, diisopropyl ether, alkyl phenyl ethers, ethylene oxide, dioxane, tetrahydrofuran, etc., ketones such as acetone, methyl ethyl ketone, acetophenone, etc., hydrocarbons including aliphatic, alicyclic, and aromatic hydrocarbons, as, for example, butane, isobutane, pentane, isopentanes, hexane, and higher homologs thereof, as for example, paraffin hydrocarbons, cyclohexane, benzene, toluene, etc. With respect to the use of halogenated compounds in the process, it should be pointed out that while any fluoro, chloro, bromo, or iodo compound will undergo fragmentation on exposure to fission fragments and hence will undergo the reaction in accordance with this invention, only the fluorinated hydrocarbons would be of any practical value since the chloro, bromo, and iodo compounds would significantly reduce the neutron economy of an atomic pile and hence the reaction would not be economical. Any other organic compound or combination of compounds may likewise be exposed to fission fragments to synthesize other organic compounds.

In carrying out the process of this invention, the fissionable material is intimately contacted with the organic compound or mixture of organic compounds to be reacted. The fissionable material may be molecularly dispersed in the organic compound or mixture, in which case the mixture is homogeneous at least at the start of the reaction. Since the organic compounds have good (moderating) efficiency for slowing down neutrons emitted from fission, the solution may be used directly to form a critical mass in a homogeneous reactor in a manner identical to the conventional solutions of uranyl sulfate and uranyl phosphate in light or heavy water. Alternatively the fissionable material may be suspended in the liquid organic compound or compounds to produce a slurry which may be used to form a critical mass in a nuclear reactor. Since the irradiation of organic materials in general liberates hydrogen, creating reducing conditions, the uranyl salts which would form the basis of the homogeneous reactor may be reduced and the uranium precipitated as oxides with the result that a homogeneous reactor may become a slurry reactor during operation. In any event, the fissionable material can be intimately contacted with liquid organic compound or compounds to form solutions or slurries which may be employed with conventional nuclear reactor technology to create a self-sustaining nuclear reaction. Hence if conventional reactor technology is employed, the organic reactant or mixture of organic reactants is desirably in a liquid state.

In order to use a large fraction of the total effect available from fissioning, it is also important to have the fissionable material subdivided into particles having diameters considerably less than the distance which the fission fragments will travel from the point of fissioning. Unless this situation prevails, most of the fission fragments will dissipate their energies within the fissionable material and never reach the organic chemical reactants. Accordingly, the fissionable material may be in the form of a true solution or if solid it should be very finely divided. For example, if the fissionable material is uranium oxide, it should be subdivided into particles less than about 15 microns in diameter, and preferably less than about 6 microns in diameter. While it is true that a small fraction of the total energy, namely, some of the gamma-radiation, some of the beta-radiation, and some of the neutron energy, will reach the reactants and cause a minor reaction to take place even if the fissionable material is not so finely divided, the reaction will not be as economic nor the energy so fully used as in the case where the fissionable material is in the form of a true solution or in a very finely divided state. Any method of bringing about an intimate contact between the fissionable material and the molecules of organic reactant or reactants may be used. If soluble in the organic reactant, the fissionable material may be simply dissolved therein or if insoluble it may be dispersed by any means throughout the organic reactant.

It is shown above that the intimate mixture of fissionable materials and organic reactants may be used to furnish the entire quantity of uranium required to form a critical mass and maintain a self-sustaining neutron reaction. Alternatively the intimate mixture may be passed continuously through a loop in any type of nuclear reactor or may be inserted batchwise into the neutron flux from a nuclear reactor as was shown in the examples. Suitable nuclear reactors for loop or batch operation include any of those in operation and listed in Nucleonics, 10, No. 3, 10–16 (March 1952) and Nucleonics, 11, No. 6, 65–69 (June 1953). Nuclear reactors available for public use include, in particular, the one at Brookhaven National Laboratory, Upton, New York, and the Materials Testing Reactor in Arco, Idaho. In addition, plutonium production reactors are suitable neutron sources although these reactors are not generally available for public use. Alternatively, suitable neutron sources would include other nuclear reactors constructed according to the teachings of S. Glasstone and M. C. Edlund, Elements of Nuclear Reactor Technology, Van Nostrand, New York (1952), or of the Oak Ridge School of Reactor Technology, or of the Reactor Engineering Lectures given at Argonne National Laboratory. Additional information on nuclear reactor design is available to those skilled in the art who have access to Atomic Energy Commission classified security data. Much of this classified information has served as the basis for patent applications, such as one by E. Fermi and L. Szilard, filed December 19, 1944. This application has subsequently issued as U.S. Patent 2,708,656. Other applications are issuing as security regulations permit. Although an operating nuclear reactor is the best source of neutron flux large enough to produce commercial quantities of organic chemicals according to this invention, it is still within the scope of this invention to expose the intimate mixture of fissionable material and organic reactants to the neutron flux emanating from a radium-beryllium source, a plutonium-beryllium source or other neutron sources.

As is well understood in the art, fissionable material, for example, uranium-235, plutonium-239, or uranium-233, is caused to fission by capture of neutrons within the nucleus. The source of such neutrons is immaterial to the basic principle of this invention. However, as is well known, a self-sustaining source of neutrons can be set up in fissionable material if the proper conditions of mass of fissionable material and ratio of fissionable material to moderator are established, as, for example, in an atomic pile. Currently graphite, water, and heavy water are the most widely used moderators. In the present invention it is advantageous to establish a self-sustaining nuclear reactor using the organic reactants themselves as moderators, and the finely subdivided, widely dispersed fissionable material as fuel. For example, $UO_2(NO_3)_2$ and $UO_2SO_4$ are quite soluble in organic compounds and are a suitable chemical form for the fissionable material.

The organic reactant or reactants may also be subjected to fission fragments emanating from a thin film of uranium (no more than about 15 microns in thickness and preferably no more than about 6 microns in thickness), although power efficiency will be sacrificed because only the fission fragments which come through the surface of the film into the organic material will be available for causing reaction according to the process of this invention. The power loss when supported uranium films are used will be approximately 50%, depending on the geometry of the system, but the power efficiency is still a factor of about 5 better than can be obtained from types of nuclear radiation other than fission fragment radiation, when efficiency is based on energy output per unit of fissionable material which is fissioned. Alternatively, slurries, fibers and films of $Al_2O_3$, $SiO_2$, $MgSiO_3$ and the like with at least one dimension less than about 15 microns and preferably less than 10 microns, containing added uranium, may be used as sources of fission fragments in accordance with this invention.

It is obviously advantageous to design the reactor so as to obtain maximum fuel economy, using when possible the principles of breeding or converting fuel, and to make use of economies arising from continuous operation. For example, use of supported films and fibers as well as other less conventional techniques make it possible to contact organic reactants in the vapor phase with fission fragments. If the loss in power efficiency from films or fibers can be tolerated, or if the reactor is so designed as to obviate such power loss, vapor phase operation gives higher yields of useful products and greater selectivity than are obtained in the liquid phase. Although dilution of the organic reactants by going from liquid to the vapor phase is one way to increase product yields and power efficiencies, the liquid or vapor phase organic reactants may also be diluted with inert materials which can serve the function of absorbing energy from the fission fragments and become active species which will promote the organic reaction. Typical of such diluents is water, which would be broken down by the fission fragments into hydrogen, oxygen and hydroxyl radicals which in some cases are capable of abstracting hydrogen from organic materials and causing dimerization according to this invention. Typical of gaseous diluents are (1) hydrogen, which would be broken down into hydrogen atoms which would perform the hydrogen abstraction reactions, and (2) the rare gases such as helium, argon and the like which are stripped at least partially of electrons by collision with the fission fragment, and thus promote secondary ionization which may cause the desired reactions. Since the desired reactions between molecules of the organic compound or compounds are, in general, free radical in nature, such as hydrogen abstraction and radical dimerization, it is also possible to add to the reactant system small amounts of substances conventionally known as "chain transfer agents." Typical of such compounds are carbon tetrachloride, chloroform, hydrogen chloride, hydrogen bromide, and other halogen-containing compounds.

As pointed out above, the organic reactants are preferably in a liquid state in order to make best use of conventional reactor technology. Thus those compounds which are liquid at the temperature at which the reaction is carried out may be used in their natural state or they may be dissolved or mutually dispersed, as, for example, by emulsification. Preferably the organic reactant will be in a homogeneous liquid state or if a mixture of organic reactants is used, they will be uniformly mixed together in a homogeneous liquid state. This will be true whether or not the fissioning material is in solution or present as a slurry. While the reaction may be carried out in the presence of water, as, for example, with a water solution or emulsion of the organic reactants, water under the influence of fissioning nuclei is a very good oxidizing agent and hence might oxidize the intermediate organic molecular fragments as well as the products produced by the condensation of said fragments, so that an undesired product would be produced. Hence, the reaction of an organic compound with itself or the reaction of a mixture of organic compounds, when the intermediate molecular fragments from said organic compounds are extremely sensitive to oxidation, is preferably carried out in a nonaqueous medium. However, the primary reaction in most cases involves dehydrogenation, which can sometimes be promoted by a hydrogen acceptor such as an oxidizing agent. In the latter situation, water may be an acceptable and, in fact, a desirable constituent of the reaction mixture. It should be noted that even though no water is present in the starting materials, it may be produced as a by-product in the reaction, as may be the case if a carbon to hydroxyl bond of an alcohol or carboxyl group is ruptured, in which case the reaction mixture is not completely anhydrous. On the other hand, water may be used as one of the reactants, as in the preparation of phenol from benzene and water, but for the above reasons is not generally a preferred reactant when oxygen-sensitive intermediate molecular fragments are formed.

The temperature and pressure at which the reaction is carried out will depend upon the type of reaction being carried out, the nature of the organic reactants, the ease of handling the operation, etc. Obviously the temperature should be below that at which the organic reactants or products pyrolyze and preferably will be at or below the boiling point of the organic reactant at the pressure employed if a liquid phase process is being used. Generally such reactions are carried out at the ambient temperature of the reactor which in the case of the so-called test reactors is around 55–60° C., but in the case of power reactors is considerably higher. If the reaction is carried out in vapor phase, obviously higher temperatures may be used, as, for example, from about 150° C. to about 250° C. In general, a temperature of from about 0° C. to about 350° C. may be used and preferably will be from about room temperature to about 250° C.

In carrying out the process in accordance with this invention, it will be advantageous to stop the reaction at a lower conversion than is customary in the usual chemical processes in order to prevent the further reaction of the initiation reaction products. Furthermore, any slight induced radioactivity in the desired products can be lessened if the exposure of the reactants to the fissioning nuclei is held to a minimum.

The heat released in the nuclear reactor in carrying out the process of this invention can be used as a source of energy to separate the products, as, for example, by distillation, and hence provides an additional economy in carrying out the process in accordance with this invention. Reactions wherein the organic compounds produced by the process can be separated from the inorganic radioactive products by distillation will then be especially attractive and particularly since the ease with which the highly radioactive fission products and unused fissionable fuel can be removed from the products and the unreacted reactants is important.

By the term "organic molecular fragments" as used in this specification and the claims appended hereto is meant any fragment of a molecule produced on fragmentation of the molecule when exposed to fissioning atomic nuclei, as distinguished from the so-called fission fragments, i.e., the fragments of the fissioning atomic nuclei themselves. Thus it includes the fragments produced by the rupture of any bond between two atoms of a molecule as produced, for example, by the rupture of a carbon to hydrogen bond, carbon to carbon bond, carbon to oxygen bond, oxygen to hydrogen bond, etc. These fragments may or may not be free radicals depending on the bond that is ruptured and the mechanism by which the rupture occurs. The fragments so produced will then combine, to produce different compounds from the starting compounds, by a direct combination, as when two fragments produced in separate fragmentations collide, or by an indirect combination, as when one fragment causes a molecule to fragment, a fragment of that molecule being combined with the incident fragment and the other fragment of that molecule being set free to react with other fragments or molecules.

The process of this invention makes it possible to initiate reactions between compounds which are normally considered to be mutually unreactive, as, for example, a compound reacting with itself. It is highly advantageous in that it makes use of fission fragments which are more efficient in initiating the combination of stable molecules than is radiation from radioactive materials. The process can be designed to supply these fission fragments in huge numbers such that they can be used to produce far greater quantities of the product than are feasible from any other known methods. Many other variations of this process in accordance with this invention will be apparent to those skilled in the art.

This application is a continuation-in-part of our application for United States Letters Patent Serial No. 433,284, filed May 28, 1954, now abandoned.

What we claim and desire to protect by Letters Patent is:

1. The process of producing higher molecular weight organic compounds from lower molecular weight organic compounds which contain at least one carbon-to-hydrogen bond, a maximum of one functional group, and are free of olefinic unsaturation, which comprises rupturing at least a carbon-to-hydrogen bond in said compound with the subsequent union of the resulting fragments by intimately contacting fissionable material, which is in a form such that substantially all of it has at least one dimension that is less than about 15 microns, with molecules of at least one of said lower molecular weight compounds, and, at a temperature of from about 0° C. to about 250° C., stimulating the fissionable material to fission by bombardment with an integrated neutron flux at least as strong as that emanating from a radium-beryllium source during a period of at least several hours and, after decay of the radioactivity to a safe level, separating the radioactive material from the reaction material and separating the higher molecular weight organic compound so produced from the remainder of the reaction mixture.

2. The process of producing higher molecular weight organic compounds from lower molecular weight organic compounds which comprises intimately contacting fissionable material, which is in a form such that substantially all of it has at least one dimension that is less than about 15 microns, with molecules of at least one of said lower molecular weight compounds, and at a temperature of from 0° C. to about 250° C., stimulating the fissionable material to fission by bombardment with an integrated neutron flux at least as strong as that emanating from a radium-beryllium source during a period of at least several hours and, after decay of the radioactivity to a safe level, separating the radioactive material from the reaction mixture and separating the higher molecular weight organic compound so produced from the remainder of the reaction, said lower molecular weight organic compound being selected from the group consisting of monohydric alcohols, monoethers, alkyl esters of monocarboxylic acids, anhydrides of monocarboxylic acids, nitriles of monocarboxylic acids, and hydrocarbons free of olefinic unsaturation.

3. The process of producing a dihydric alcohol which comprises intimately contacting fissionable material, which is in a form such that substantially all of it has at least one dimension that is less than about 15 microns, with a monohydric alcohol and, at a temperature of from about 0° C. to about 250° C., stimulating the fissionable material to fission by bombardment with an integrated neutron flux at least as strong as that emanating from a radium-beryllium source during a period of at least several hours and, after decay of the radioactivity to a safe level, separating the radioactive material from the reaction mixture and separating the dihydric alcohol so produced from the remainder of the reaction mixture.

4. The process of producing a dinitrile which comprises intimately contacting fissionable material which is in a form such that substantially all of it has at least one dimension that is less than about 15 microns, with a mononitrile and, at a temperature of from about 0° C. to about 250° C., stimulating the fissionable material to fission by bombardment with an integrated neutron flux at least as strong as that emanating from a radium-beryllium source during a period of at least several hours and, after decay of the radioactivity to a safe level, separating the radioactive material from the reaction mixture and separating the dinitrile so produced from the remainder of the reaction mixture.

5. The process of producing a dicarboxylic acid which comprises intimately contacting fissionable material, which is in a form such that substantially all of it has at least one dimension that is less than about 15 microns, with a monocarboxylic acid and, at a temperature of from about 0° C. to about 250° C., stimulating the fissionable material to fission by bombardment with an integrated neutron flux at least as strong as that emanating from a radium-beryllium source during a period of at least several hours and, after decay of the radioactivity to a safe level, separating the radioactive material from the reaction mixture and separating the dicarboxylic acid so produced from the remainder of the reaction mixture.

6. The process of producing an aliphatic dihydric alcohol which comprises intimately contacting fissionable material, which is in a form such that substantially all of it has at least one dimension that is less than about 15 microns, with an aliphatic monohydric alcohol and, at a temperature of from about 0° C. to about 250° C., stimulating the fissionable material to fission by bombardment with an integrated neutron flux at least as strong as that emanating from a radium-beryllium source during a period of at least several hours and, after decay of the radioactivity to a safe level, separating the radioactive material from the reaction mixture and separating the dihydric alcohol so produced from the remainder of the reaction mixture.

7. The process of producing an aliphatic dinitrile which comprises intimately contacting fissionable material, which is in a form such that substantially all of it has at least one dimension that is less than about 15 microns, with an aliphatic mononitrile and, at a temperature of from about 0° C. to about 250° C., stimulating the fissionable material to fission by bombardment with an integrated neutron flux at least as strong as that emanating from a radium-beryllium source during a period of at least several hours and, after decay of the radioactivity to a safe level, separating the radioactive material from the reaction mixture and separating the dinitrile so produced from the remainder of the reaction mixture.

8. The process of producing an aliphatic dicarboxylic acid which comprises intimately contacting fissionable material, which is in a form such that substantially all of it has at least one dimension that is less than about 15 microns, with an aliphatic monocarboxylic acid and, at a temperature of from about 0° C. to about 250° C., stimulating the fissionable material to fission by bombardment with an integrated neutron flux at least as strong as that emanating from a radium-beryllium source during a period of at least several hours and, after decay of the radioactivity to a safe level, separating the radioactive material from the reaction mixture and separating the dicarboxylic acid so produced from the remainder of the reaction mixture.

9. The process of preparing ethylene glycol which comprises intimately contacting methanol with a fissionable material, which is in a form such that substantially all of it has at least one dimension that is less than about 15 microns, and, at a temperature of from about 0° C. to about 250° C., stimulating the fissionable material to fission by bombardment with an integrated neutron flux at least as strong as that emanating from a radium-beryllium source during a period of at least several hours and, after decay of the radioactivity to a safe level, separating the radioactive material from the reaction mixture and separating the ethylene glycol so produced from the remainder of the reaction mixture.

10. The process of preparing succinonitrile which comprises intimately contacting acetonitrile with a fissionable material, which is in a form such that substantially all of it has at least one dimension that is less than about 15 microns, and, at a temperature of from about 0° C. to about 250° C., stimulating the fissionable material to fission by bombardment with an integrated neutron flux at least as strong as that emanating from a radium-beryllium source during a period of at least several hours and, after decay of the radioactivity to a safe level, separating the radioactive material from the reaction mixture and separating the succinonitrile so produced from the remainder of the reaction mixture.

11. The process of preparing succinic acid which comprises intimately contacting acetic acid with a fissionable material, which is in a form such that substantially all of it has at least one dimension that is less than about 15 microns, and, at a temperature of from about 0° C. to about 250° C., stimulating the fissionable material to fission by bombardment with an integrated neutron flux at least as strong as that emanating from a radium-beryllium source during a period of at least several hours and, after decay of the radioactivity to a safe level, separating the radioactive material from the reaction mixture and separating the succinic acid so produced from the remainder of the reaction mixture.

12. The process of preparing ethylene glycol which comprises intimately contacting methanol in vapor phase with a fissionable material, which is in a form such that substantially all of it has at least one dimension that is less than about 15 microns, and, at a temperature within the range of the boiling point of said mixture up to about 250° C., stimulating the fissionable material to fission by bombardment with an integrated neutron flux at least as strong as that emanating from a radium-beryllium source during a period of at least several hours and, after decay of the radioactivity to a safe level, separating the radioactive material from the reaction mixture and separating the ethylene glycol so produced from the remainder of the reaction mixture.

13. The process of preparing ethylene glycol which comprises intimately contacting a mixture of methanol and water in vapor phase with a fissionable material, which is in a form such that substantially all of it has at least one dimension that is less than about 15 microns, and, at a temperature within the range of the boiling point of said mixture up to about 350° C., stimulating the fissionable material to fission by bombardment with an integrated neutron flux at least as strong as that emanating from a radium-beryllium source during a period of at least several hours and, after decay of the radioactivity to a safe level, separating the radioactive material from the reaction mixture and separating the ethylene glycol so produced from the remainder of the reaction mixture.

14. The process of preparing ethylene glycol which comprises intimately contacting a mixture of methanol and carbon tetrachloride in vapor phase with a fissionable material, which is in a form such that substantially all of it has at least one dimension that is less than about 15 microns, and, at a temperature within the range of the boiling point of said mixture up to about 350° C., stimulating the fissionable material to fission by bombardment with an integrated neutron flux at least as strong as that emanating from a radium-beryllium source during a period of at least several hours and, after decay of the radioactivity to a safe level, separating the radioactive material from the reaction mixture and separating the ethylene glycol so produced from the remainder of the reaction mixture.

References Cited in the file of this patent

UNITED STATES PATENTS

| | | |
|---|---|---|
| 2,350,330 | Remy | June 6, 1944 |
| 2,743,223 | McClinton et al. | Apr. 24, 1956 |
| 2,825,688 | Vernon | Mar. 4, 1958 |
| 2,928,780 | Harteck et al. | Mar. 15, 1960 |
| 2,958,637 | Vorhees | Nov 1, 1960 |

FOREIGN PATENTS

| | | |
|---|---|---|
| 708,901 | Great Britain | May 12, 1954 |
| 756,014 | Great Britain | Aug. 29, 1956 |

OTHER REFERENCES

Glasstone: Principles of Nuclear Reactor Engineering, D. Van Nostrand Co., N.Y., 1955, page 9.

Atomic Energy Commission Publication BNL-389 (T-73), May 1956, pp. IV, 19, 20.

Journal of Chemical Education, vol. 28, pp. 404-420 (1951).

Biochemical Journal, vol. 45, pp. 543-546 (1949).